United States Patent
Chen et al.

(10) Patent No.: US 7,464,956 B2
(45) Date of Patent: Dec. 16, 2008

(54) FOLDABLE FRAME ASSEMBLY FOR SUSPENDING A MACHINE ABOVE A GROUND SURFACE

(75) Inventors: Yu-Tien Chen, Taichung (TW); Chi-Yao Chai, Taichung (TW)

(73) Assignee: P & F Brother Industrial Corporation, Taichung (TW)

( * ) Notice: Subject to any disclaimer, the term of this patent is extended or adjusted under 35 U.S.C. 154(b) by 629 days.

(21) Appl. No.: 11/259,494

(22) Filed: Oct. 26, 2005

(65) Prior Publication Data
US 2007/0089649 A1   Apr. 26, 2007

(51) Int. Cl.
   *B62B 1/00*   (2006.01)
   *B62B 3/00*   (2006.01)
(52) U.S. Cl. .................. 280/639; 280/30; 280/641; 280/654; 280/47.24
(58) Field of Classification Search ............. 280/30, 280/641, 639, 645, 654, 640, 651, 652, 47.24, 280/47.18, 47.27; 144/286.1, 286.5, 287; 248/439, 588, 631, 647, 676; 451/307, 342, 451/363
See application file for complete search history.

(56) References Cited
U.S. PATENT DOCUMENTS

| | | | | |
|---|---|---|---|---|
| 3,669,031 A | * | 6/1972 | Cole | ............. 280/641 |
| 4,369,985 A | * | 1/1983 | Bourgraf et al. | ............ 280/641 |
| 5,676,124 A | * | 10/1997 | Lee | ............................. 451/307 |
| 5,778,953 A | * | 7/1998 | Braddock | ................ 144/286.1 |
| 6,886,836 B1 | * | 5/2005 | Wise | ............................ 280/30 |
| 6,942,229 B2 | * | 9/2005 | Brazell et al. | ................. 280/30 |
| 7,059,616 B2 | * | 6/2006 | Wu | ......................... 280/47.24 |
| 7,077,421 B2 | * | 7/2006 | Wu | ............................ 280/645 |
| 7,086,434 B2 | * | 8/2006 | Lee | .......................... 144/286.1 |
| 7,213,829 B2 | * | 5/2007 | Wu | ............................ 280/645 |
| 7,255,355 B2 | * | 8/2007 | Chisholm et al. | ............. 280/30 |

* cited by examiner

*Primary Examiner*—Hau V Phan
(74) *Attorney, Agent, or Firm*—Frommer Lawrence & Haug LLP; Ronald R. Santucci

(57) ABSTRACT

A foldable frame assembly includes first and second frames pivotally connected to each other and respectively having a wheel-carrying end and a foot end. The tabletop bracing member is pivotally connected to the first frame in proximity of a handgrip portion, and supports a machine thereon such that in a propped up position, the center of gravity of the machine is disposed rearwards from the table top bracing member. The tabletop bracing member has a retaining region brought to engage a retained region on the second frame. The base prop is disposed to sit on the ground surface in the propped up position so as to relieve the frame subassembly of the mass of the machine, thereby facilitating displacement of the frame assembly to a folded or unfolded position. A locking member is disposed to place engagement of the retaining region with a selected one of the first and second retained regions.

11 Claims, 10 Drawing Sheets

FOLDABLE FRAME ASSEMBLY FOR SUSPENDING A MACHINE ABOVE A GROUND SURFACE

BACKGROUND OF THE INVENTION

1. Field of the Invention

This invention relates to a foldable frame assembly for suspending a machine above a ground surface, more particularly to a foldable frame assembly which can be folded conveniently and rapidly with less effort.

2. Description of the Related Art

Referring to FIG. 1, in co-pending U.S. patent application Ser. No. 11/012,385, the applicant disclosed a foldable frame assembly 10 that includes a base frame 11, a tabletop unit 12, a prop member 13, a front locking unit 14, a bracing member 15, and a rear locking unit 16. The base frame 11 has a wheel-carrying end provided with two wheels 113 rotatably mounted thereon, a handgrip end 112, and an intermediate portion 111. The tabletop unit 12 has a front pivot end pivotally mounted on the intermediate portion 111 so as to enable the tabletop unit 12 to turn relative to the base frame 11. The prop member 13 has an upper pivot end 131 pivotally mounted on the intermediate portion 111, and a flange 132 having first and second positioning slots 1321, 1322. The front locking unit 14 has a seat 141 secured on the handgrip end 112 of the base frame 11, and a spring-loaded retaining pin 142 movably disposed on the seat 141 such that the retaining pin 142 engages respectively the first and second positioning slots 1321, 1322 in unfolded and folded positions. The bracing member 15 has a lower end pivotally mounted on the wheel-carrying end of the base frame 11, and an upper end which is slidably coupled to the tabletop unit 12. The rear locking unit 16 includes a seat 161 secured on the tabletop unit 12, and a spring-loaded actuating member 162 movably mounted on the seat 161 so as to engage a first engaging portion (not shown) and a second engaging portion 151 of the bracing member 15, respectively, in the unfolded and folded positions.

During folding of the frame assembly 10, the user has to hold the tabletop unit 12 with one hand, which has a bulky machine mounted thereon, to prevent inadvertent falling thereof, and operate the front and rear locking units 14,16 with the other hand to permit the tabletop unit 12 to slowly move downward for folding. Hence, the user bears the combined weight of the machine and the tabletop unit 12 during the folding operation. Moreover, turning operations of the prop member 13 and the bracing member 15 have to be conducted separately, thereby rendering the folding operation inconvenient and time-consuming.

SUMMARY OF THE INVENTION

The object of the present invention is to provide a foldable frame assembly which can be folded conveniently and rapidly with less effort.

According to this invention, the foldable frame assembly includes a frame subassembly including first and second frames, a tabletop bracing member, a wheel member, a base prop, and a locking member. The first frame has a wheel-carrying end, and a first intermediate portion extending from the wheel-carrying end to terminate at a handgrip portion. The second frame has a foot end adapted to be supported on the ground surface and disposed forwardly of the wheel-carrying end in a working position, and a second intermediate portion extending from the foot end to terminate at a coupling segment that has first and second retained regions disposed proximate to and distal from the foot end, respectively. The second intermediate portion is pivotally connected to the first intermediate portion such that the second frame is turned about the linking axis from a folded position where the foot end is close to the handgrip portion, to the working position. The tabletop bracing member has a front end pivotally connected to the first intermediate portion and disposed in proximity of the handgrip portion, and a third intermediate portion adapted to secure a machine thereon such that in the working position, the center of gravity of the machine is located above the third intermediate portion, and such that in a propped up position, the center of gravity of the machine is disposed rearwards from the third intermediate portion. The third intermediate portion extends from the front end rearwardly to terminate at a retaining region, and is brought to engage the first retained region when the second frame is in the folded position or to engage the second retained region when the second frame is in the working position. The wheel member is rotatably mounted on the wheel carrying end, and is disposed to be rollable on the ground surface when the third intermediate portion is displaced from the working position to the propped up position. The base prop includes a joined end connected with the retaining region, and a rest end extending from the joined end away from the retaining region such that in the propped up position, the rest end is disposed to sit on the ground surface and under the center of gravity of the machine so as to relieve the frame subassembly of the mass of the machine, thereby facilitating displacement of the frame subassembly to the folded position by virtue of rolling of the wheel member. The locking member is disposed to place the engagement of the retaining region with a selected one of the first and second retained regions in a locked position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
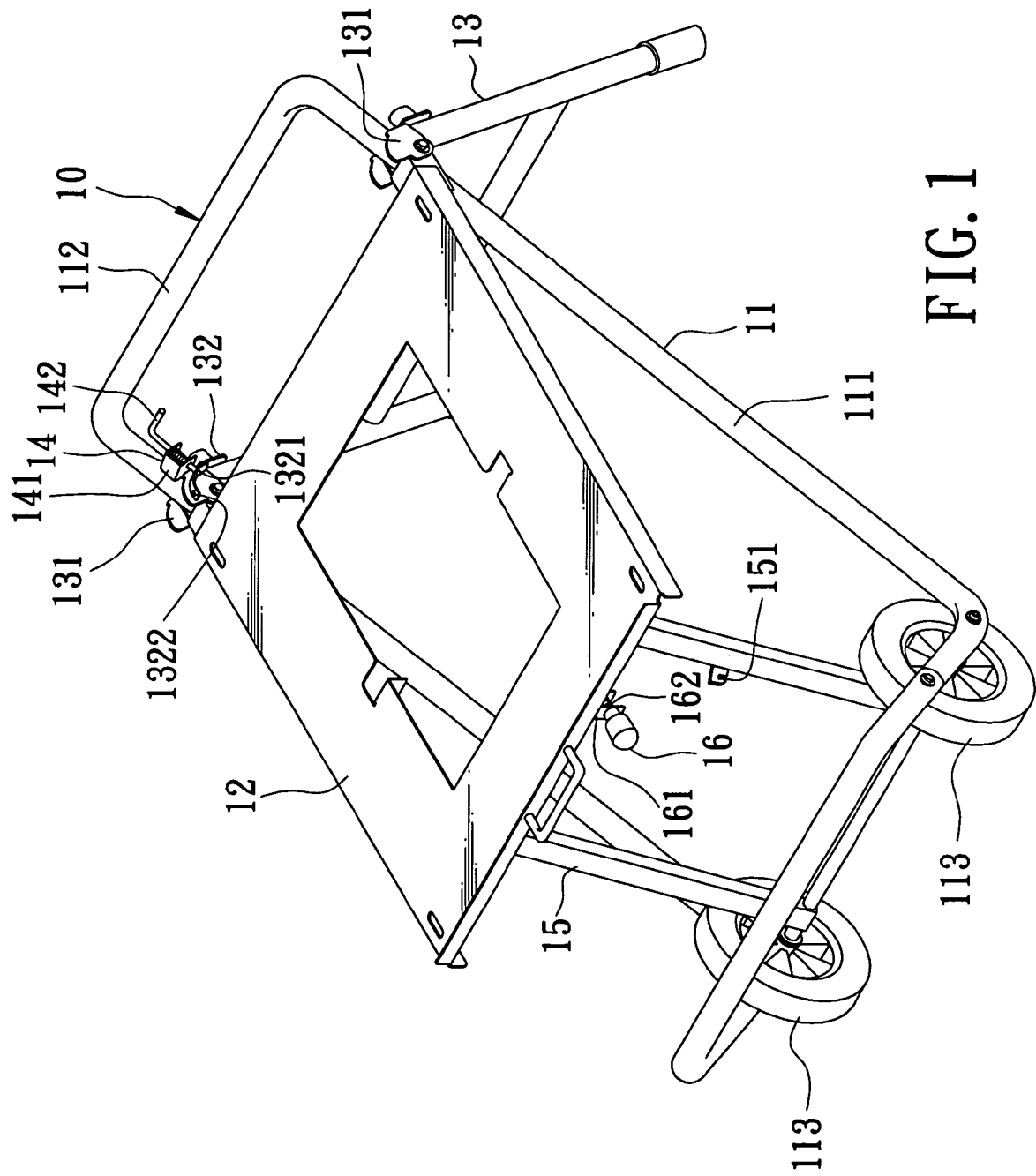
FIG. 1 is a perspective view of a co-pending U.S. patent application Ser. No. 11/012,385.
Figure 2:
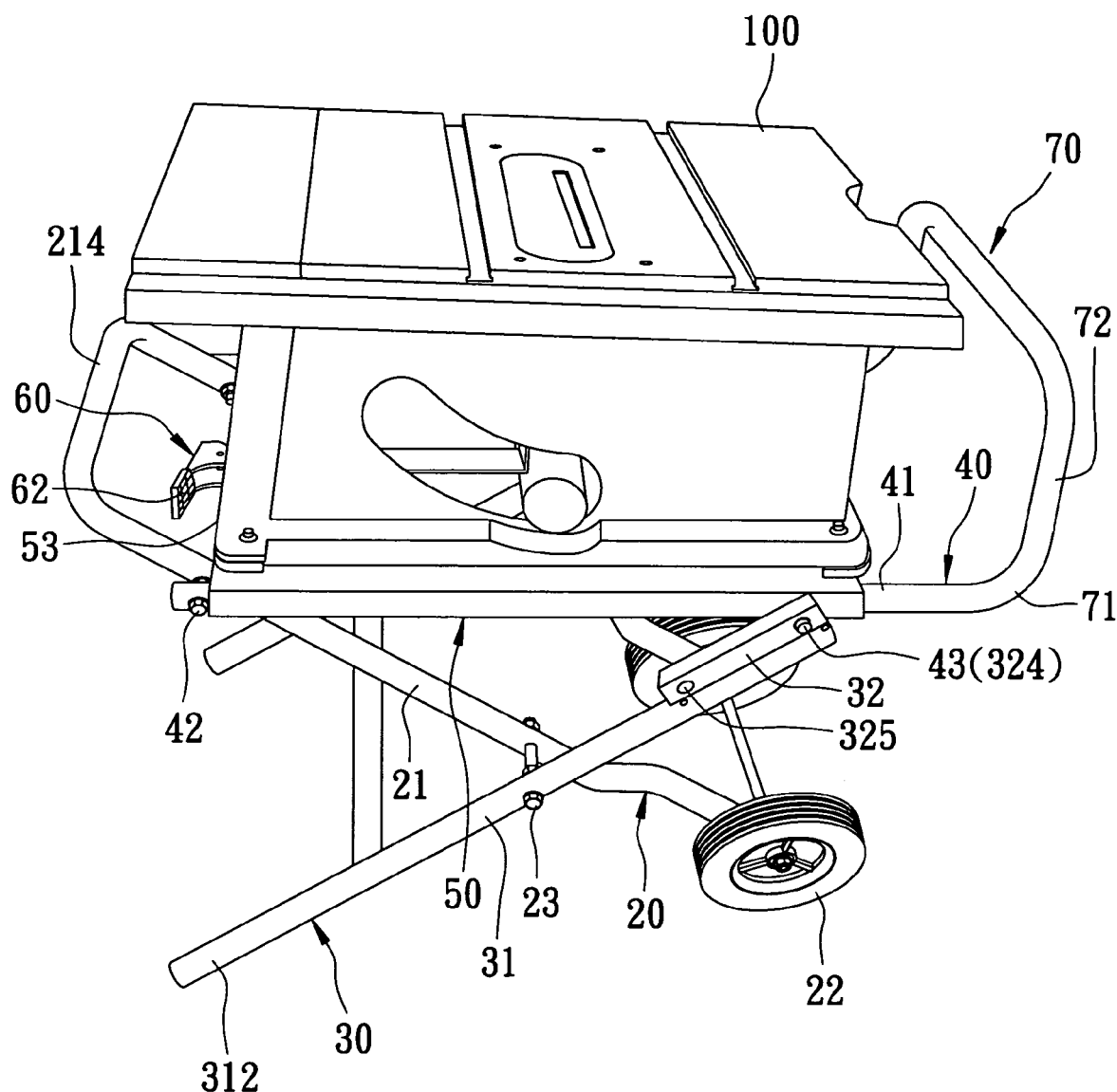
FIG. 2 is a perspective view of the preferred embodiment of a foldable frame assembly according to this invention when unfolded.
Figure 3:
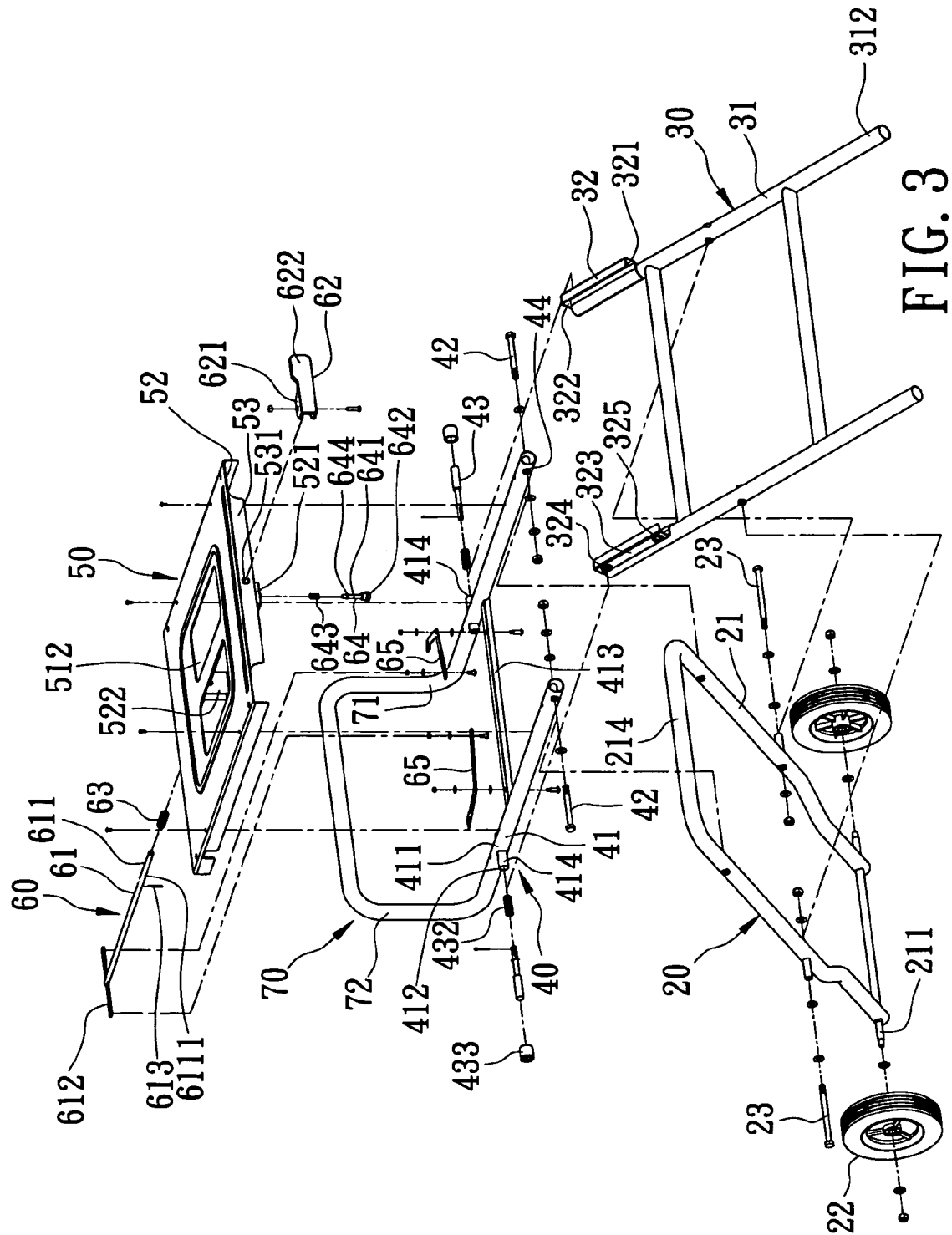
FIG. 3 is an exploded perspective view of the preferred embodiment.

Referring to FIGS. 2 and 3, the preferred embodiment of a foldable frame assembly according to the present invention is shown to comprise a frame subassembly with first and second frames 20,30, a tabletop bracing member 40, a wheel member with a pair of wheels 22, a base prop 70, a tabletop 50, a locking member, and a control unit 60.

The first frame 20 has a wheel-carrying end 211 for mounting the wheels 22 rotatably thereon about a wheel axis in a transverse direction, and a first intermediate portion 21 extending from the wheel-carrying end 211 to terminate at a handgrip portion 214. The second frame 30 has a foot end 312 adapted to be supported on the ground surface and disposed forwardly of the wheel-carrying end 211 in a working position, where a machine 100 is supported on the tabletop 50 for suspending above the ground surface, and a second intermediate portion 31 extending from the foot end 312 to terminate at a coupling segment 32. The coupling segment 32 is formed with two keyways 323 extending therealong. Each of the keyways 323 has a lower open end 321 and an upper closed end 322 which are disposed proximate to and distal from the foot end 312, respectively, to serve as first and second retained regions (indicated by numerals 321,322), respectively. The second intermediate portion 31 is pivotally connected to the first intermediate portion 21 of the first frame 20 about a linking axis parallel to the wheel axis of the wheels 22 by means of two linking pins 23. Thus, the second frame 30 is turned about the linking axis between a folded position (see FIG. 6), where the foot end 312 is close to the handgrip portion 214, and the working position.

Figure 4:
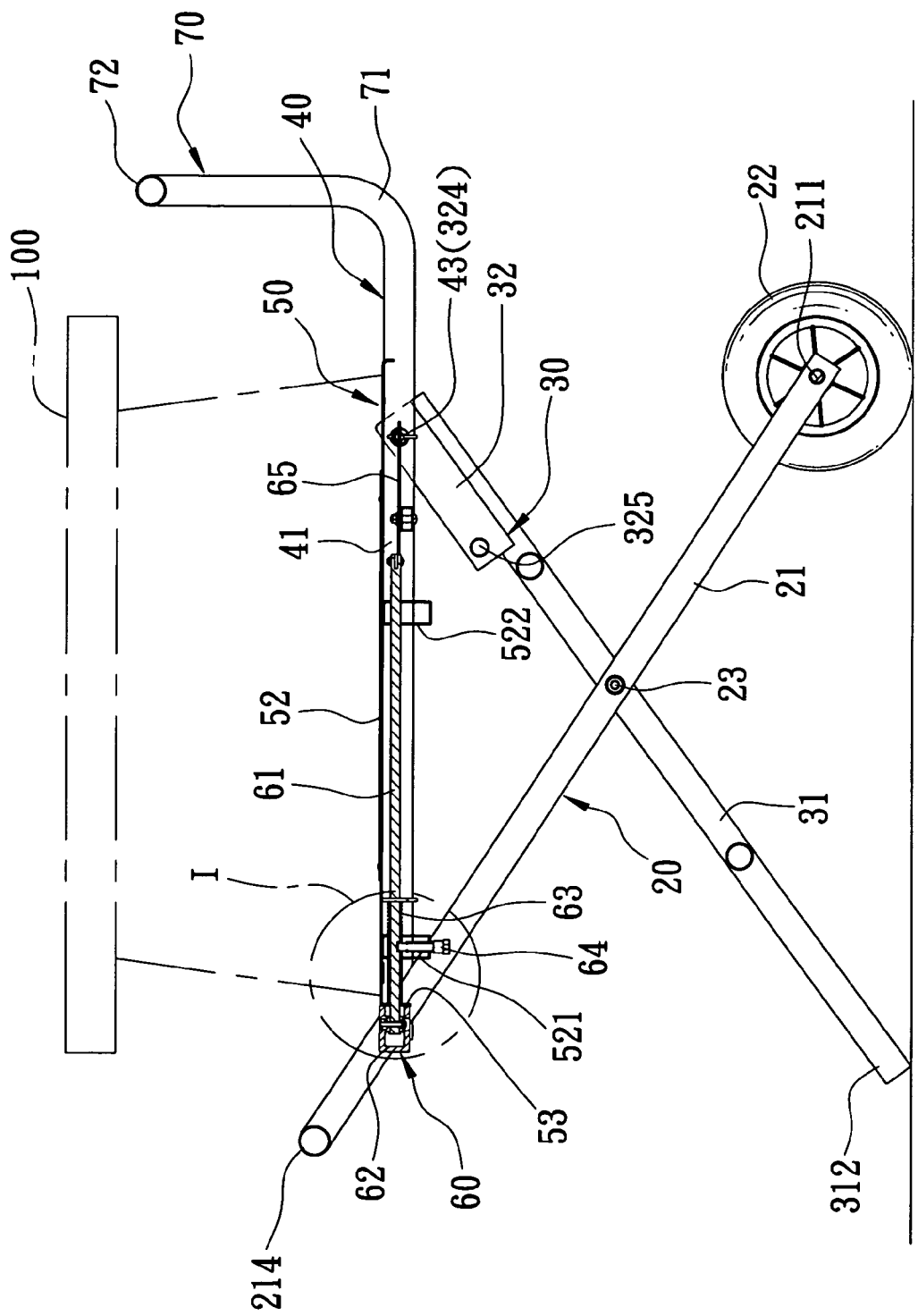
FIG. 4 is a schematic side view of the preferred embodiment in a working position.
Figure 10:
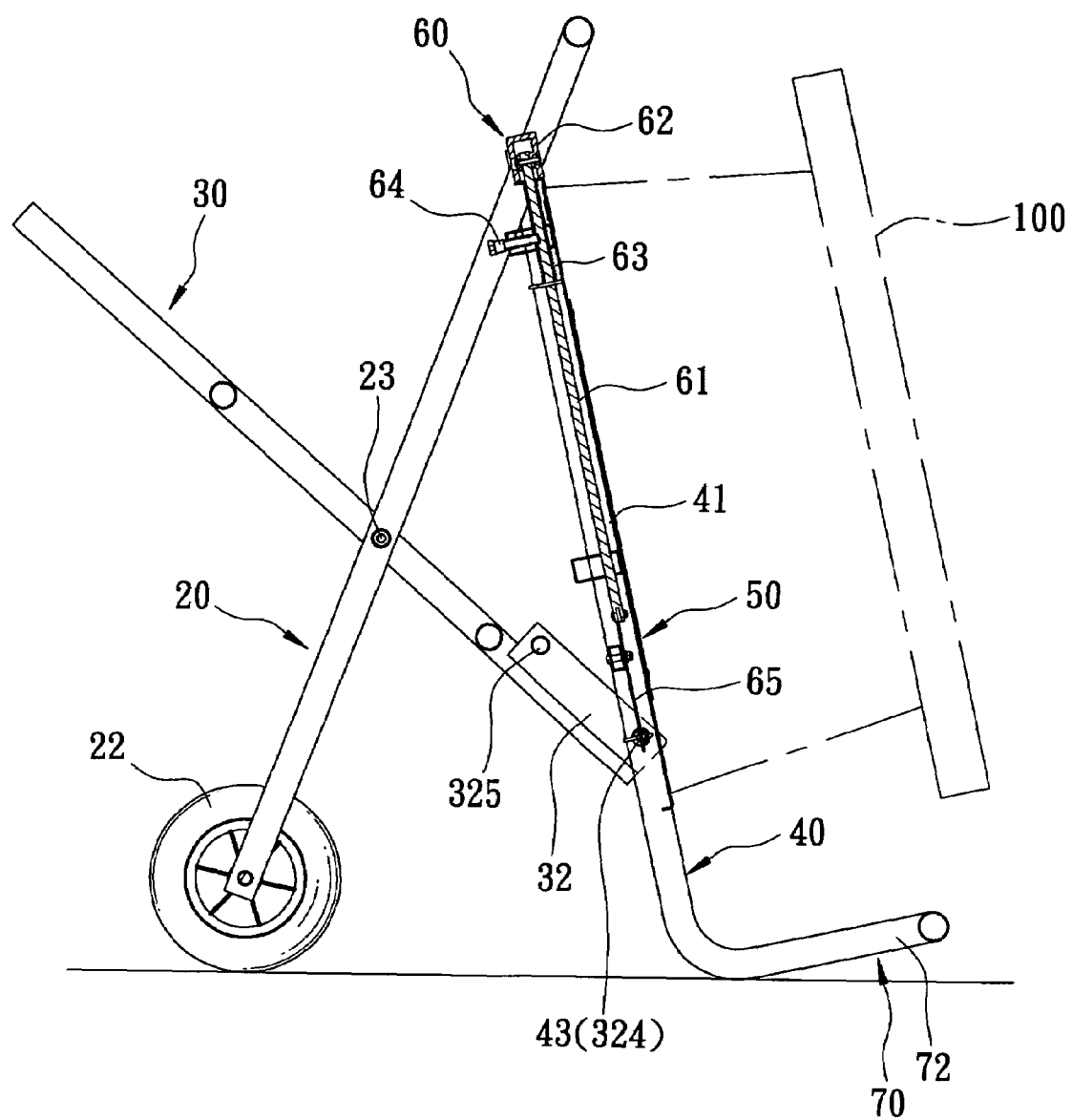
FIG. 10 is a schematic side view of the preferred embodiment in an unfolded and propped up position.

The tabletop bracing member 40 has a front end 44 which is pivotally connected to the first intermediate portion 21 of the first frame 20 about a front axis parallel to the linking axis by means of two pivot pins 42 and which is disposed in proximity of the hand grip portion 214, and a third intermediate portion 41 which retains the tabletop 50 thereon. Thus, in the working position, as shown in FIG. 4, the center of gravity of the machine 100 is located above the third intermediate portion 41. In a propped up position, as shown in FIG. 10, the center of gravity of the machine 100 is disposed rearwards from the third intermediate portion 41. It is noted that when the third intermediate portion 41 is displaced from the working position (FIG. 4) to the propped up position (FIG. 10), the wheels 22 are disposed to be rollable on the ground surface so as to enable the user to operate effortlessly. Moreover, the third intermediate portion 41 extends from the front end 44 rearwardly to terminate at a retaining region 411. The retaining region 411 has two keys 414 which extend therefrom in the transverse direction so as to be guided by the keyways 323, respectively, to slide between the working position and the folded position. The keys 414 are brought to engage the first retained region 321 when the second frame 30 is in the folded position, or to engage the second retained region 322 when the second frame 30 is in the working position. Each key 414 has a retaining hole 412 formed therein and extending in the transverse direction through the retaining region 411.

Figure 6:
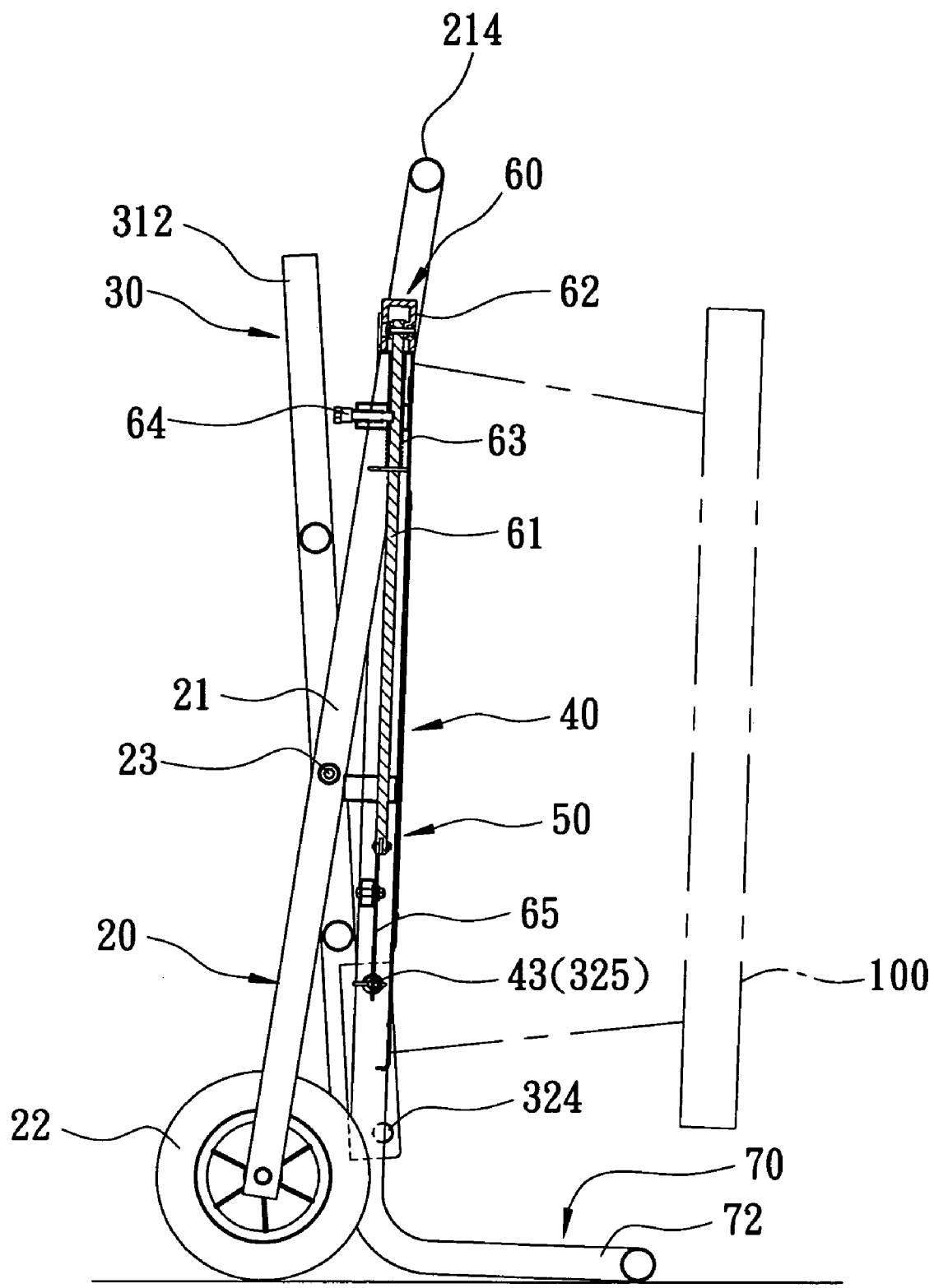
FIG. 6 is a schematic side view of the preferred embodiment in a folded and propped up position.

The base prop 70 includes a joined end 71 connected to the retaining region 411, and a rest end 72 extending from the joined end 71 away from the retaining region 411. In this embodiment, the base prop 70 is integrally formed with the tabletop bracing member 40. Thus, in the propped up position, as shown in FIG. 10, the rest end 72 is disposed to sit on the ground surface and under the center of gravity of the machine 100 so as to relieve the frame subassembly of the mass of the machine 100, thereby facilitating displacement of the frame subassembly to the folded position, as shown in FIG. 6, by virtue of rolling of the wheels 22.

Figure 7:
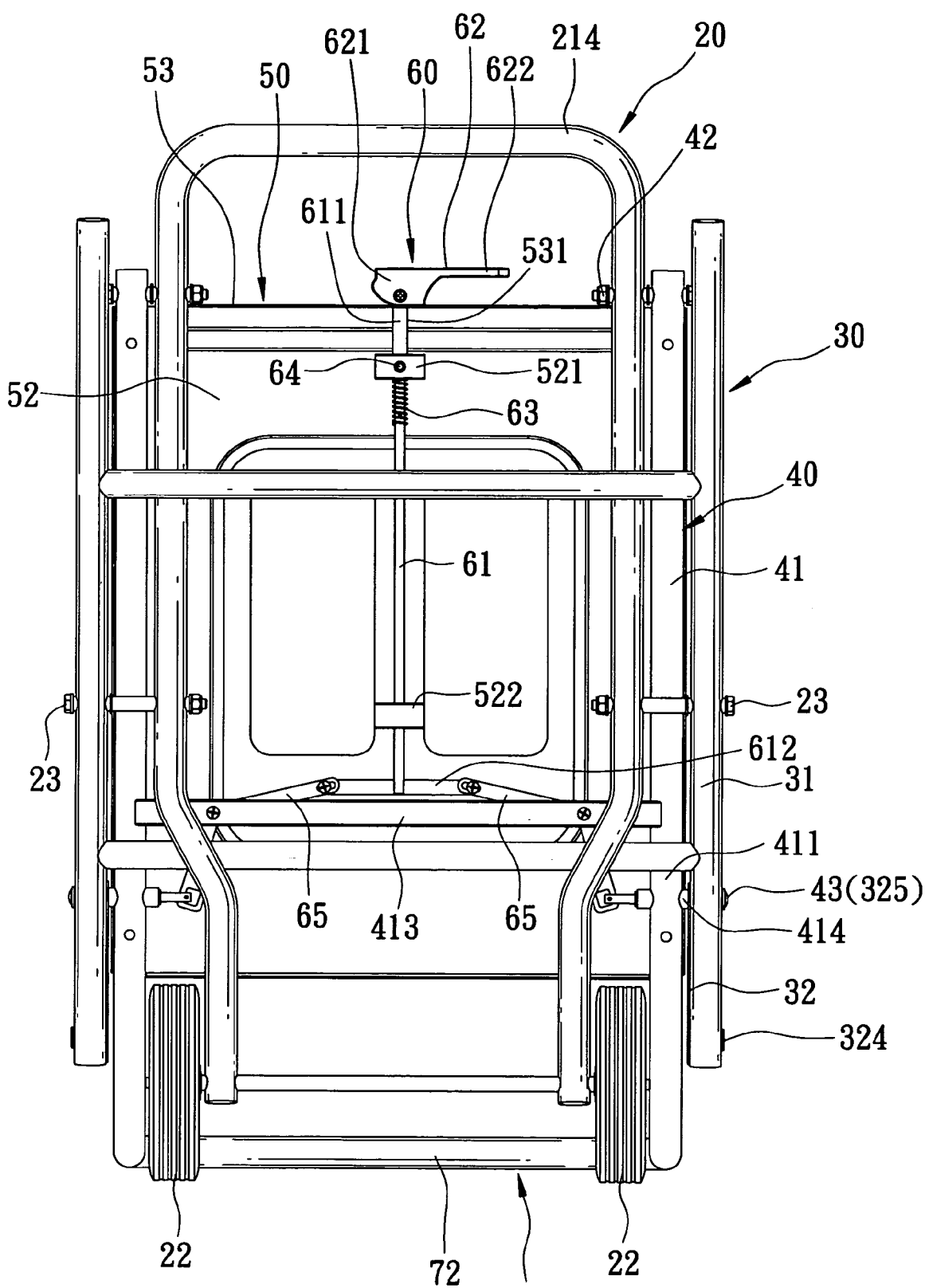
FIG. 7 is a schematic bottom view of the preferred embodiment when locked in a folded position.
Figure 9:
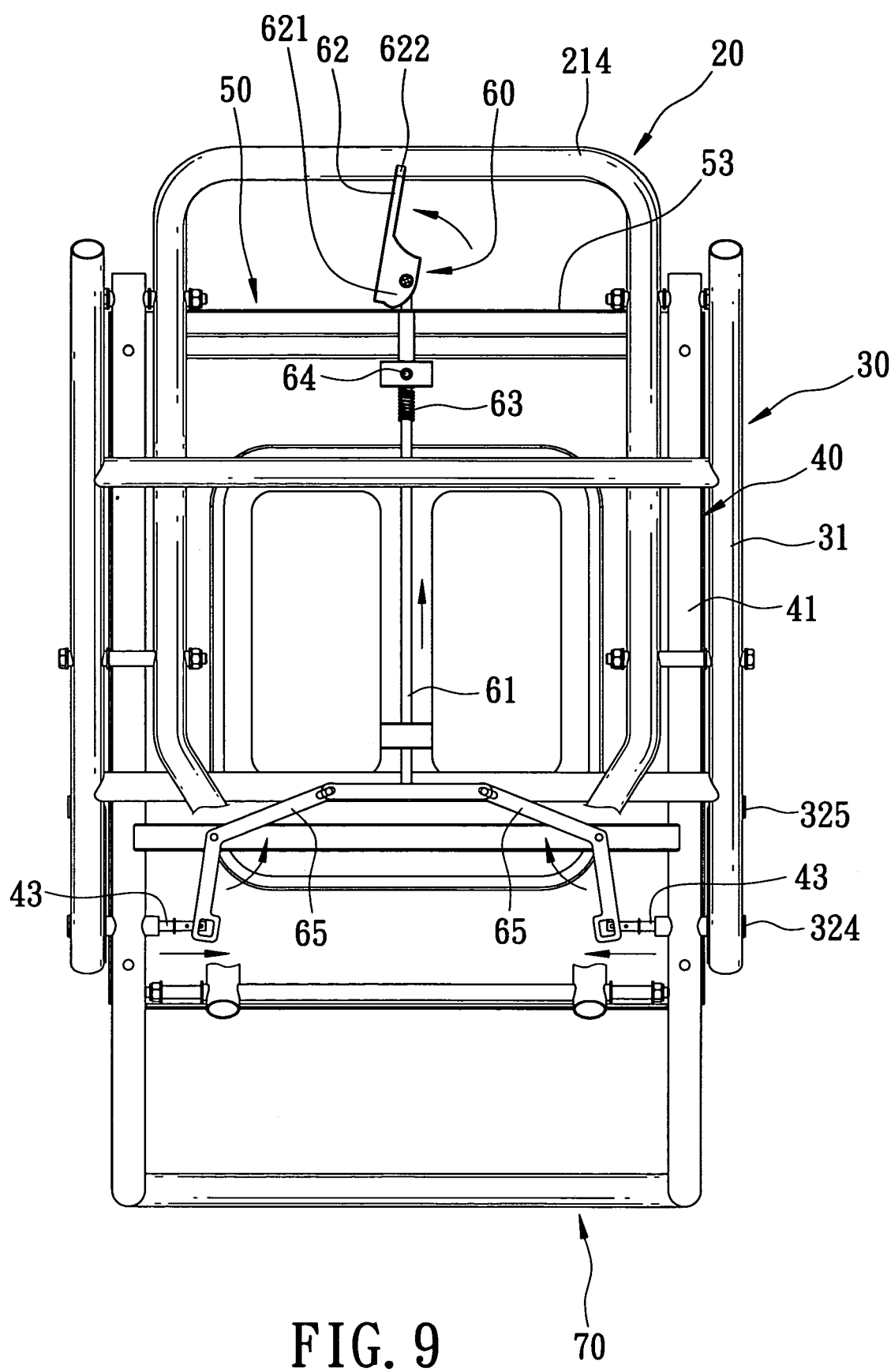
FIG. 9 is a schematic bottom view of the preferred embodiment when unlocked.

The locking member includes two first retained holes 325 and two second retained holes 324 formed in the first and second retained regions 321, 322, respectively, and two locking pins 43 disposed respectively in the retaining holes 412 in the keys 414 and movable outwardly of the retaining region 411 in the transverse direction relative to the keyways 323. Each locking pin 43 has a locking end 433 which is disposed to be movable in one of the first and second retained holes 325, 324, thereby placing the engagement of the retaining region 411 with the selected one of the first and second retained regions 321, 322 in a locked position, as shown in FIG. 7, and out of the first and second retained holes 325, 324, thereby placing the engagement of the retaining region 411 with the first and second retained regions 321, 322 in an unlocked position, as shown in FIG. 9. Two first biasing members 432 are disposed in the retaining holes 412 to bias the locking ends 433 to move into the selected one of the first and second retained holes 325, 324.

The tabletop 50 has first and second seats 521, 522 disposed on an underside 52 thereof, two open slots 512 extending therethrough to facilitate collection of dust generated by a working operation of the machine 100, and a front side wall 53 with a through hole 531.

As shown in FIGS. 3 and 7, the control unit 60 includes an actuator rod 61 which extends through the first and second seats 521, 522 and which is movable relative to the tabletop 50 along a moving axis that is transverse to the transverse direction, and which has rear and front rod ends 612, 611 opposite to each other along the moving axis. The front rod end 612 extends through the through hole 531. Two L-shaped linkages 65 are pivotally mounted on a crosspiece 413 of the tabletop bracing member 40. Each linkage 65 interconnects the rear rod end 612 of the actuator rod 61 and the respective locking pin 43 such that the movement of the actuator rod 61 along the moving axis is transmitted to pull the locking pins 43 in the transverse direction so as to move the locking ends 433 out of the first and second retained holes 325, 324, as shown in FIG. 9, thereby permitting the second frame 30 to turn relative to the first frame 20 to place the frame subassembly in the unlocked position. A lever 62 is pivotally connected to the front rod end 611 about a pivot axis that is radial to the moving axis, and has a cam end 621 and an operated lever end 622 that are disposed at two opposite sides of the pivot axis. The cam end 621 is configured such that, when the operated lever end 622 is operated to turn the cam end 621 about the pivot axis, the cam end 621 is brought to abut against the front side wall 53 with a friction force which is sufficient to hold the front rod end 611 in the unlocked position. A second biasing member 63 is disposed to abut against a pin 613 on the actuator rod 61 to bias the front rod end 611 of the actuator rod 61 toward the locked position.

Figure 5:
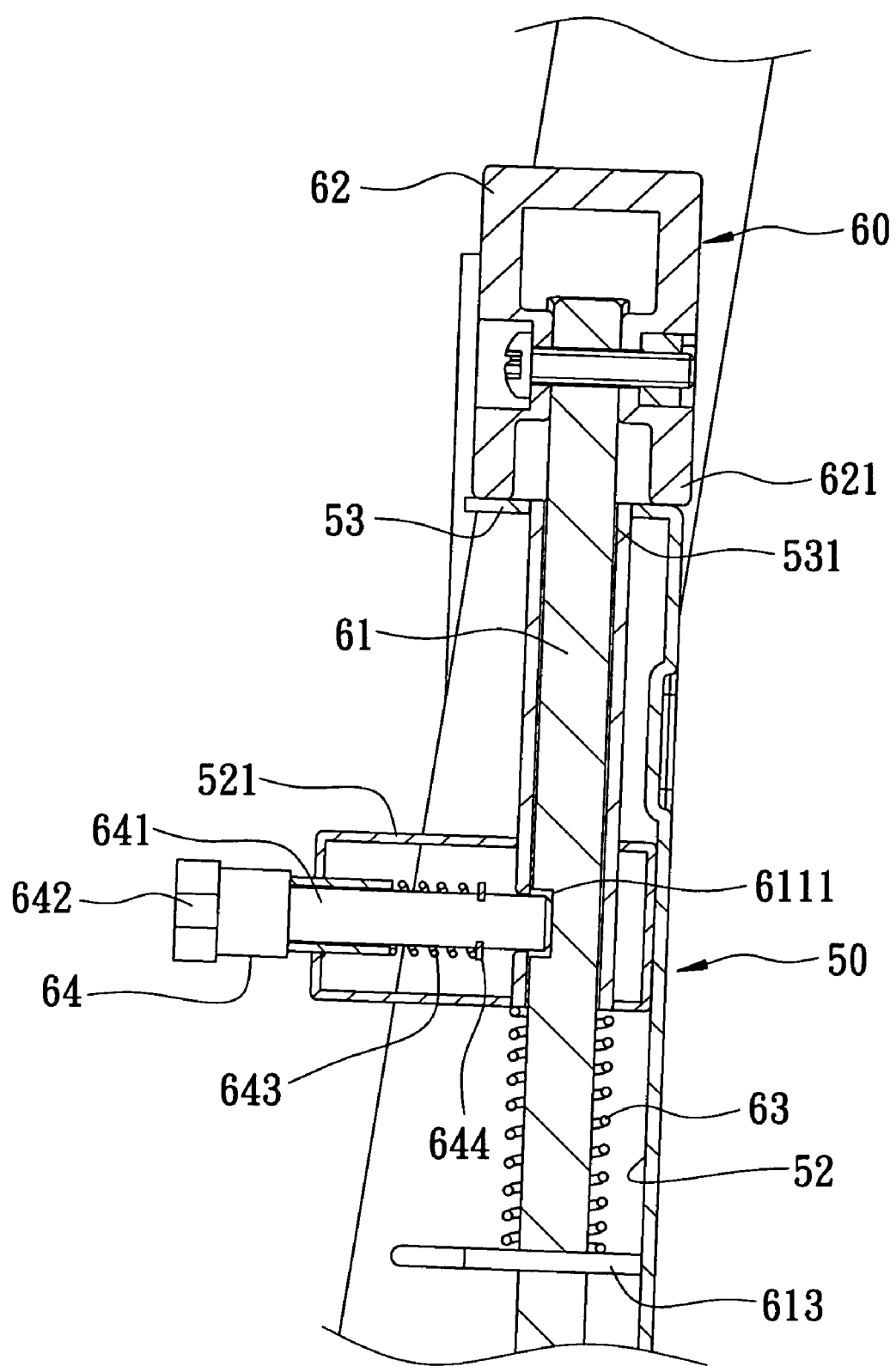
FIG. 5 is an enlarged sectional view of an encircled portion (I) in FIG. 4.

With reference to FIG. 5, the control unit 60 further includes a safety member 64 which has a safety rod 641 movably disposed on the first seat 521, a pull head 642 mounted on an end of the safety rod 641, a ring 644 secured on the safety rod 641, and a biasing spring 643 sleeved on the safety rod 641 and abutting against the ring 644 to bias the safety rod 641 to engage a recess 6111 formed in the actuator rod 61 so as to releasably restrict movement of the actuator rod 61, thereby preventing undesired displacement of the frame subassembly to the folded position.

As shown in FIGS. 6 and 7, when the frame assembly is in the folded and propped up positions, the base prop 70 rests on the ground surface, and the wheels 22 are rollable on the ground surface so as to facilitate transportation of the machine 100. At this time, the locking pins 43 are engaged in the first retained holes 325.

Figure 8:
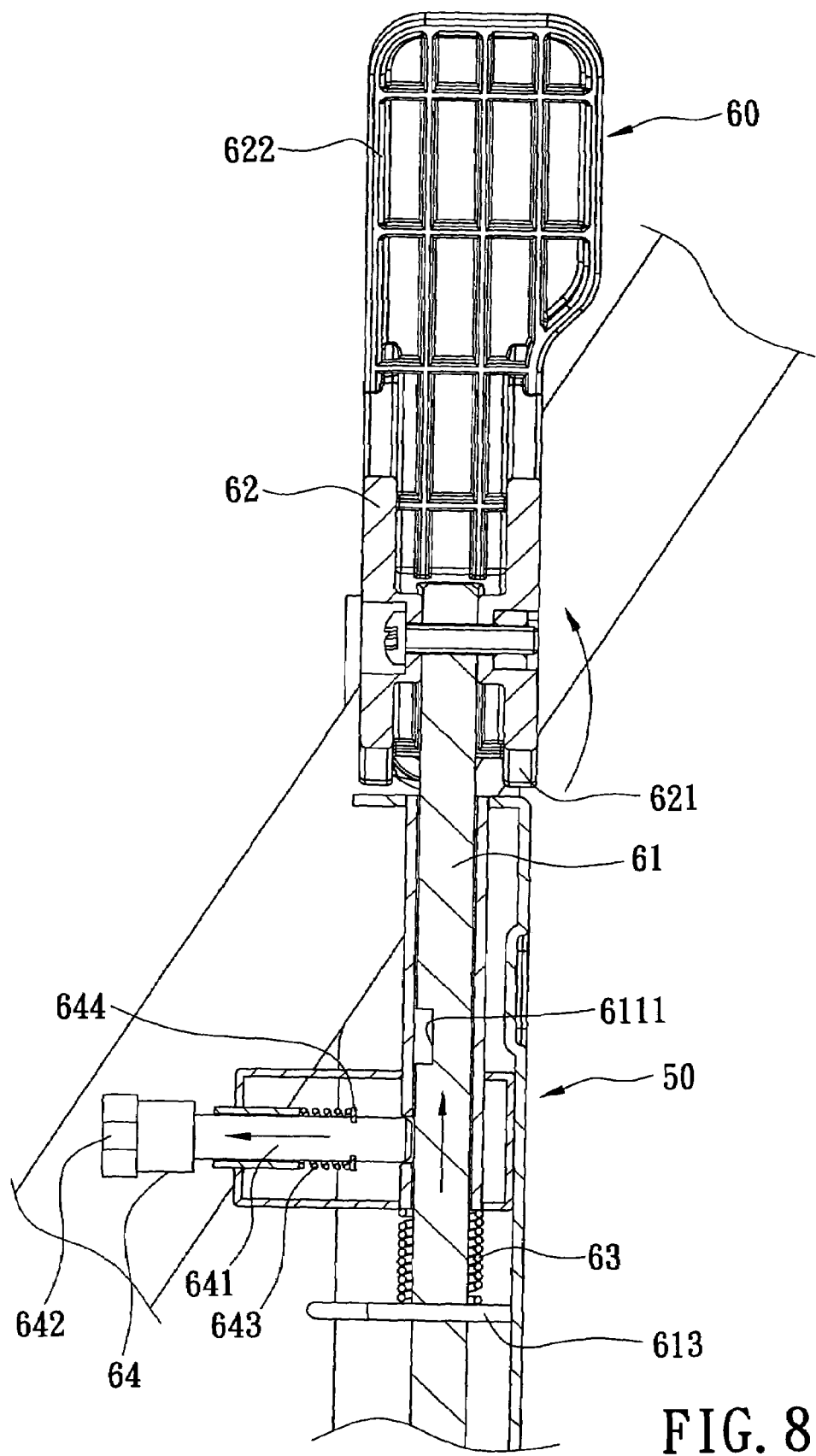
FIG. 8 is a fragmentary sectional view showing a safety member when released from an actuator rod for folding the frame assembly.

As shown in FIG. 8, when it is desired to unfold the frame assembly, the user first pulls the pull head 642 to bring the safety rod 641 to disengage from the recess 6111. Subsequently, referring to FIG. 9, the user operates the lever 62 to turn the cam end 621 so as to move the actuator rod 61 forwardly. The linkages 65 are actuated to turn so as to move the locking pins 43 inwardly to disengage from the first retained holes 325. Meanwhile, the cam end 621 can abut against the front side wall 53 to hold the actuator rod 61 in this unlocked position. Finally, the user can unfold the second frame 30 relative to the first frame 20 such that the locking pins 43 slide along the keyways 323 to the second retained region 322 so as to engage the second retained holes 324, as shown in FIG. 10.

As illustrated, by virtue of the pivot connection between the first and second frames 20, 30, and by virtue of the sliding engagement of the keys 414 with the keyways 323, the user can simultaneously fold and unfold the second frame 30 and the tabletop bracing member 40 relative to the first frame 20 so as to render the folded and unfolded operations convenient and rapid. It is noted that the lever 62 and the handgrip portion 214 are disposed on the same side to thereby result in convenient manipulation. Moreover, when folded and unfolded, the frame assembly can be displaced to the propped up position as shown in FIGS. 6 and 10, in which the center of gravity of the machine 100 is disposed rewards from the tabletop bracing member 40, i.e., the weight of the machine 100 is borne by the base prop 70, thereby enabling the user to fold and unfold the frame assembly with less effort.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A foldable frame assembly for suspending a machine above a ground surface in a working position, comprising:
    a frame subassembly including
        a first frame having a wheel-carrying end, and a first intermediate portion extending from said wheel-carrying end to terminate at a hand grip portion, and
        a second frame having a foot end adapted to be supported on the ground surface and disposed forwardly of said wheel-carrying end in the working position, and a second intermediate portion extending from said foot end to terminate at a coupling segment that has first and second retained regions disposed proximate to and distal from said foot end, respectively, said second intermediate portion being pivotally connected to said first intermediate portion about a linking axis in a transverse direction such that, said second frame is turned about the linking axis from a folded position where said foot end is close to said handgrip portion, to the working position;
    a tabletop bracing member having a front end which is pivotally connected to said first intermediate portion about a front axis parallel to the linking axis and which is disposed in proximity of said handgrip portion, and a third intermediate portion which is adapted to secure the machine thereon such that in the working position, the center of gravity of the machine is located above said third intermediate portion, and such that in a propped up position, the center of gravity of the machine is disposed rearwards from said third intermediate portion, said third intermediate portion extending from said front end rearwardly to terminate at a retaining region, and being brought to engage said first retained region when said second frame is in the folded position or to engage said second retained region when said second frame is in the working position;
    a wheel member which is rotatably mounted on said wheel carrying end about a wheel axis parallel to the linking axis, and which is disposed to be rollable on the ground surface when said third intermediate portion is displaced from the working position to the propped up position; and
    a base prop including a joined end connected to said retaining region and a rest end extending from said joined end away from said retaining region such that in the propped up position, said rest end is disposed to sit on the ground surface and under the center of gravity of the machine so as to relieve said frame subassembly of the mass of the machine, thereby facilitating displacement of said frame subassembly to the folded position by virtue of rolling of said wheel member; and
    a locking member disposed to place the engagement of said retaining region with a selective one of said first and second retained regions in a locked position.

2. The foldable frame assembly of claim 1, wherein said coupling segment has a keyway which is disposed thereon and which extends there along between said second and first retained regions, said retaining region having a key which extends from said third intermediate portion in the transverse direction so as to be guided by said keyway to slide between the working position and the folded position.

3. The foldable frame assembly of claim 2, wherein said locking member includes a retaining hole formed in said key and extending in the transverse direction through said retaining region, first and second retained holes formed in said first and second retained regions, respectively, and a locking pin disposed in said retaining hole and movable outwardly of said retaining region in the transverse direction relative to said keyway, said locking pin having a locking end which is disposed to be moved in and out of one of said first and second retained holes, thereby placing the engagement of said retaining region with the selected one of said first and second retained regions in the locked position or in an unlocked position.

4. The foldable frame assembly of claim 3, wherein said locking member further includes a first biasing member which is disposed in said retaining hole to bias said locking end to move into a selected one of said first and second retained holes.

5. The foldable frame assembly of claim 3, further comprising a tabletop adapted to support the machine thereon, said tabletop being mounted securely on said third intermediate portion.

6. The foldable frame assembly of claim 5, further comprising a control unit including an actuator rod which is disposed on and which is movable relative to said tabletop along a moving axis that is transverse to the transverse direction, and which has a rear rod end that is coupled to pull said locking pin, and a front rod end that is opposite to said rear rod end along the moving axis and that extends outwardly of said tabletop so as to be operated manually such that operation of said front rod end actuates movement of said rear rod end along the moving axis to pull said locking pin so as to move said locking end out of one of said first and second retained holes, thereby permitting said second frame to turn relative to said first frame.

7. The foldable frame assembly of claim 6, wherein said control unit further includes a linkage which interconnects said rear rod end of said actuator rod and said locking pin such that the movement of said actuator rod along the moving axis is transmitted to pull said locking pin in the transverse direction so as to place the engagement of said retaining region in the unlocked position.

8. The foldable frame assembly of claim 6, wherein said control unit further includes a lever which is pivotally connected to said front rod end about a pivot axis that is radial to the moving axis, and which has a cam end and an operated lever end that are disposed at two opposite sides of the pivot axis, said cam end being configured such that, when said operated lever end is operated to turn said cam end about the pivot axis, said cam end is brought to abut against said tabletop with a friction force which is sufficient to hold said front rod end in the unlocked position.

9. The foldable frame assembly of claim 6, wherein said control unit further includes a second biasing member disposed to bias said front rod end of said actuator rod toward the locked position.

10. The foldable frame assembly of claim 6, wherein said control unit further includes a safety member which is disposed to releasably restrict movement of said actuator rod so as to prevent undesired displacement of said frame subassembly to the folded position.

11. The foldable frame assembly of claim 1, wherein said base prop is integrally formed with said tabletop bracing member.

* * * * *